United States Patent
Choudhery

(10) Patent No.: US 9,000,074 B2
(45) Date of Patent: Apr. 7, 2015

(54) AQUEOUS POLYMER DISPERSIONS

(75) Inventor: Riaz Ahmad Choudhery, Solihull (GB)

(73) Assignee: AKZO Nobel Coatings International B.V., Arnhem (NL)

( * ) Notice: Subject to any disclaimer, the term of this patent is extended or adjusted under 35 U.S.C. 154(b) by 108 days.

(21) Appl. No.: 13/505,623

(22) PCT Filed: Nov. 11, 2010

(86) PCT No.: PCT/EP2010/067329
§ 371 (c)(1),
(2), (4) Date: May 2, 2012

(87) PCT Pub. No.: WO2011/058121
PCT Pub. Date: May 19, 2011

(65) Prior Publication Data
US 2012/0220699 A1    Aug. 30, 2012

(30) Foreign Application Priority Data

Nov. 12, 2009  (EP) .................................... 09175798

(51) Int. Cl.
| | | |
|---|---|---|
| C09D 133/12 | (2006.01) | |
| C09D 101/12 | (2006.01) | |
| C09D 131/04 | (2006.01) | |
| C08J 3/05 | (2006.01) | |
| C08J 3/24 | (2006.01) | |
| C08L 1/14 | (2006.01) | |
| C08L 23/08 | (2006.01) | |
| C08L 23/10 | (2006.01) | |
| C08L 33/06 | (2006.01) | |
| C08L 51/06 | (2006.01) | |
| C09D 5/02 | (2006.01) | |
| C09D 123/08 | (2006.01) | |
| C09D 123/10 | (2006.01) | |
| C09D 123/14 | (2006.01) | |
| C09D 133/06 | (2006.01) | |
| C09D 133/08 | (2006.01) | |
| C09J 131/04 | (2006.01) | |
| C09J 133/02 | (2006.01) | |
| C09J 133/06 | (2006.01) | |

(52) U.S. Cl.
CPC .. *C08J 3/246* (2013.01); *C08J 3/05* (2013.01); *C08J 2323/10* (2013.01); *C08J 2333/06* (2013.01); *C08L 1/14* (2013.01); *C08L 23/0853* (2013.01); *C08L 23/0869* (2013.01); *C08L 23/0884* (2013.01); *C08L 23/10* (2013.01); *C08L 33/06* (2013.01); *C08L 51/06* (2013.01); *C08L 2201/50* (2013.01); *C08L 2201/54* (2013.01); *C08L 2666/04* (2013.01); *C09D 5/02* (2013.01); *C09D 5/022* (2013.01); *C09D 123/0869* (2013.01); *C09D 123/10* (2013.01); *C09D 123/14* (2013.01); *C09D 131/04* (2013.01); *C09D 133/06* (2013.01); *C09D 133/08* (2013.01); *C09J 131/04* (2013.01); *C09J 133/02* (2013.01); *C09J 133/06* (2013.01)

(58) Field of Classification Search
USPC .................................. 524/41, 524, 517, 522
See application file for complete search history.

(56) References Cited

U.S. PATENT DOCUMENTS

2005/0100754 A1    5/2005  Moncla et al.

FOREIGN PATENT DOCUMENTS

| EP | 1457513 | 9/2004 | |
|---|---|---|---|
| WO | WO 2010/055019 | 5/2010 | |
| WO | WO 2010/055019 A1 * | 5/2010 | ................. C08J 3/11 |

OTHER PUBLICATIONS

International Search Report and Written Opinion, PCT/EP2010/067329, mailed Feb. 17, 2011.
International Preliminary Report on Patentability, PCT/EP2010/067329, issued May 15, 2012.

* cited by examiner

*Primary Examiner* — Robert D. Harlan
(74) *Attorney, Agent, or Firm* — Kenyon & Kenyon LLP

(57) ABSTRACT

A process for the manufacture of an aqueous polymer dispersion comprising the steps of i)providing a mixture of a first and second polymer each having a viscosity greater than 30 Pa·s at $100s^{-1}$ when measured at 100° C., the mixture comprising a) from 1 to 60 parts by weight of a first polymer immiscible in aqueous medium and optionally comprising reactive moieties and b) from 40 to 99 parts by weight of a second polymer comprising dispersing 10 groups, the polymer being miscible in the aqueous medium and optionally further comprising moieties reactive with the moieties on the first polymer ii) causing the polymers to melt at a chosen temperature under conditions of high shear in an extruder to form an intimate mixture of the polymers iii)optionally causing the reactive moieties of the first and second polymer to 1 react with each other under conditions of high shear in an extruder, to form a reacted mixture iv) quench cooling the molten mixture of step ii) or step iii) outside the extruder to form a solid product v) optionally breaking up the solid product into smaller pieces 20 vi) contacting the solid product with the aqueous medium wherein the aqueous medium dissolves the second polymer but not the first polymer to form a dispersion comprising microparticles of the first polymer in an aqueous solution of the second polymer.

21 Claims, No Drawings

AQUEOUS POLYMER DISPERSIONS

REFERENCE TO RELATED APPLICATIONS

This application is the U.S. National Phase of PCT/EP2010/067329 filed on Nov. 11, 2010, and claims the benefit of EP Application No. 09175798.9, filed on Nov. 12, 2009.

This invention relates to a process of preparing aqueous polymer dispersions useful as architectural coating compositions and can coatings for use in metal food and drinks containers. Aqueous polymer dispersions are also provided.

Metal food and drink containers, for example cans and lidded trays, are usually coated on the inside to prevent reaction between the contents and the metal from which the can is formed. Such reaction leads both to unwanted deterioration of the can and also potentially damaging effects to the contents, particularly in terms of changes in quality and taste. Without an interior coating, most cans containing food or drink would not remain usable for very long. The coating is often applied to the flat metal by roller coating before the can is formed and then dried and/or cured in a stoving operation. Typical oven temperatures used are about 200° C. for 6 to 12 minutes for sheet metal and about 200° C. for 8-30 seconds for coil metal. The can is then formed from the flat metal by a drawing process before being filled with food or drink and finally sealed.

Such can coatings are required to have very good flexibility, adhesion, sterilisation resistance, stability properties and blush resistance. Flexibility and adhesion are essential if the coating is to remain intact during the can formation process when the coated flat metal sheet is drawn into the form of the can.

When the cans are filled with food, the contents are usually sterilised by heating the sealed can to temperatures of around 120° C. to 140° C. for 10 to 90 minutes (depending on the nature of the food). The coating is then in direct contact with the contents of the can for a considerable period of time which can be many years. During sterilisation and subsequent storage, the coating is required to maintain its integrity so as to prevent corrosion of the metal can and to prevent metal migration into the can contents. Additionally, the coating must not impair the contents by releasing unwanted material or by altering the flavour or appearance. These resistance properties impact not only on the shelf life of the product but also on public health and safety. Thus, there are particularly stringent and specific requirements of coating compositions for can interiors which are different from those for other coatings.

In some applications the coating is also used to bond the lid to the container body. For example, pet food can be provided in a tray with a thin, full length aluminium lid. The lid is attached to the tray by means of a coating, usually crosslinked, which on application of heat and pressure forms an adhesive bond or seal between the lid and the tray. The contents are accessed by simply peeling back the flexible aluminium lid which in turn breaks the seal. The strength of the seal is very important as it must be strong enough to survive the manufacturing and filling process, yet not be so strong that breaking the seal becomes difficult.

In many applications the coatings are applied as very thin films to produce dried films of no more than 10 µm thickness. In such circumstances the coatings must be free of particulate matter greater than this size.

Polymer dispersions are often used to formulate coatings. Unfortunately, the dispersions can contain particles too large to be suitable for use in applications requiring very thin films. Coatings derived from such dispersions are uneven producing not only rough surfaces but also problems in properties such as adhesion and protective properties.

The problem of large particles is especially difficult when preparing aqueous dispersions of high molecular weight polymers. The reason for this is that such high molecular weight polymers have high viscosity, even at elevated temperatures of 100° C. They are thus difficult to break-up to form the small sized particles hereinbefore described necessary to produce stable aqueous dispersions.

Nevertheless, such polymers are especially useful in coating metal food and drink containers but known dispersions of such polymers are available only as dispersions in organic solvents, or if available in aqueous medium, at very low solids. Of course, dispersions in such organic solvents contain high levels of volatile organic compounds (VOC) which are generally regarded as environmentally unfriendly. Thus there is a need for aqueous dispersions of small particles of such high viscosity polymers.

Accordingly, in a first aspect of the invention there is provided a process for the manufacture of an aqueous polymer dispersion comprising the steps of i) providing a mixture of a first and second polymer each having a viscosity greater than 30 Pa·s at 100 s$^{-1}$ when measured at 100° C., the mixture comprising
   a) from 1 to 60 parts by weight of a first polymer immiscible in aqueous medium and optionally comprising reactive moieties and
   b) from 40 to 99 parts by weight of a second polymer comprising dispersing groups, the polymer
ii) causing the polymers to melt at a chosen temperature under conditions of high shear in an extruder to form an intimate mixture of the polymers
iii) optionally causing the reactive moieties of the first and second polymer to react with each other under conditions of high shear in the extruder, to form a reacted mixture
iv) quench cooling the molten mixture of step ii) or step iii) outside the extruder to form a solid product
v) optionally breaking up the solid product into smaller pieces
vi) contacting the solid product with the aqueous medium wherein the aqueous medium dissolves the second polymer but not the first polymer to form a dispersion comprising microparticles of the first polymer in an aqueous solution of the second polymer.

Where the first and second polymer each comprise moieties capable of reacting together, at least some of the second polymer are covalently bound to the particles of the first polymers.

The steps carried out in the extruder are free of any carrier liquid.

Particularly useful first polymers include polyesters, such as polyethylene terephthalate, polybutylene terephthalate; polyamides including Nylon® 6, Nylon® 6,6 and Nylon® 12; and polyolefins such as polyethylene, polypropylene, polybutylenes and modified polyolefins such as propylene-maleic anhydride polymers, also known as maleinised polypropylene; and propylene-ethylene-maleic anhydride polymers; and ethylene vinyl acetatepolymers; and ethylene-methyl acrylate-glycidyl methacrylate polymers. Suitable examples of such polymers include Evatane 28-150, Fusabond M613-05, Polybond3000, EVA 25-19, E-MA-GMA. Cellulose butyl acetate polymer such as Solus 2100 are also useful first polymers.

Other useful first polymers include the naturally occurring polyhydroxyalkanoates (PHA's) biopolyesters produced by some bacteria. These PHA's are of particular interest as they are available on a sustainable basis, requiring a renewable resource, namely corn syrup, as the feedstock in their production, rather than hydrocarbons obtained from diminishing fossilized sources such as crude oil and coal. The PHA's have the further advantage that they are biodegradable. Suitable such PHA's include polyhydroxybutyrate and copolymers such as polyhydroxybutyrate-valerate.

Aqueous dispersions of the invention preferably comprise polyhydroxyalkanoates as the first polymer, more preferably polyhydroxybutyrate.

Crystalline or semi-crystalline polymers having crystallinity of from 5 to 70% are preferred.

For simplicity, the use of the term 'polymer' throughout this specification is intended to include copolymer.

A preferred polyolefin, in can coating applications, is polypropylene as its high melting point allows sterilisation. Preferably the polypropylene polymer has a weight average molecular weight (Mw) of from 30,000 Daltons to 300,000 Daltons, more preferably from 40,000 to 150,000 Daltons, even more preferably from 45,000 to 130,000 Daltons and most preferably from 45,000 to 100,000 Daltons. Below about 30,000 Daltons the polymer has low mechanical strength and the seal formed is weak, resulting in an increased risk of seal failure occurring. Above about 300,000, the polypropylene becomes difficult to process easily due to high melt viscosity, even in the very high shear conditions prevailing in an extruder.

The polypropylene polymer preferably carries sufficient carboxylic acid groups or carboxylic acid anhydride groups to give an acid value (AV) of from 2 to 50 mg KOH/g of non-vol polymer, preferably from 2 to 20 mg KOH/g and most preferably from 2 to 9 mg KOH/g. The inclusion of acid functionality improves adhesion to metal in the final coating and also increases the capability for reaction between the first polymer and the second polymer-where the second polymer also comprises suitable reactive moieties. Alternatively the polypropylene may contain other reactive groups such as oxirane-a suitable example of a such polymer is polypropylene modified by gylcidyl methacrylate; or hydroxyl groups-a suitable example of such a polymer is polypropylene modified by 2-hydroxyethyl methacrylate); or silane-a suitable example of such a polymer is polypropylene modified by vinyltrimethoxysilane; or isocyanate-a suitable example of such a polymer is polypropylene modified by vinyl isocynate); or amine-a suitable example of such a polymer is polypropylene modified by 2-(tert-butylamino)ethyl methacrylate.

The second polymer may be any polymer that is self-dispersible or soluble in the aqueous medium. For example if the second polymer comprises sufficient acidic dispersing moieties then the polymer becomes soluble as the pH of the aqueous medium is increased above 7. Similarly, if the second polymer has cationic groups such as amines then this polymer becomes water soluble/dispersible when the pH is below 7.

Suitable examples of the second polymer include acid functional acrylic polymers; acid functional polythene and copolymers of styrene such as styrene copolymerised with maleic anhydride or acrylic acid. Other suitable second polymers are those with high level of hydroxyl groups such as poly (2-hydroxyethyl methacrylate). Also suitable second polymers are polyacrylonitrile and polyethylenimine.

It is preferred that the second polymer comprises reactive moieties that are capable of reacting with any reactive moieties on the first polymer. More preferred are polymers useful in forming protective coatings for metal containers. Suitable examples include acrylic resins especially acrylic resins containing acid groups such as Elvacite 2669; polyolefins such as Primacor 59901; polymers of styrene and its derivatives such as α-methyl styrene with, for example acid containing, such as (meth)acrylic, or acid generating moieties, such as maleic anhydride. Suitable such polymers include the SMA range available from Cray Valley; polyesters, polyurethanes and celluloses.

Suitable examples of co-reactive moieties include epoxy (oxirane), hydroxyl, amine, carboxylic acid and isocyanate. Carboxylic acid and hydroxyl groups are preferred as these are suitable for use in coatings in contact with food and beverages.

The reactive moieties of the second polymer are preferably in molar excess over the reactive moieties on the first polymer. This is especially so when the reactive moieties are able to react with external crosslinking resins. Even more preferably there is a molar excess of second polymer over the first polymer.

It is thought that at least some of any reactive moieties on the first polymer react with at least some of any reactive moieties of the second polymer. For example, where the second polymer has hydroxyl (or amine) moieties it can react with the carboxylic acid moiety on the second polymer to form a polymer that has an ester (or an amide) linkage and this reaction product polymer can act to stabilise the particles. Of course, the second polymer, comprising dispersing moieties is a dispersant for the first polymer and acts to stabilise the particles of the dispersion. It is also thought that any co-reaction between the first and second polymers acts to anchor the second polymer to the first thereby improving stability of the final aqueous dispersion.

Other coreactive polymer combinations may be used in the invention. Suitable such combinations include epoxy-amine; epoxy-acid; isocyanate-amine and isocyanate-hydroxyl.

Preferably the first and second polymers comprise reactive moieties wherein the moieties on the first polymer are reactive with moieties on the second polymer, more preferably at least some of the reactive moieties have been caused to react. In certain circumstances all of the reactive moieties on one of the polymers are caused to react.

Where the dispersing group on the second polymer can react with the reactive moiety on the first polymer it is preferred that the dispersing groups are in molar excess to ensure good dispersion of the first polymer.

The second polymer may be anionic or cationic. Preferably it is anionic since most coating ingredients are also anionic. Suitable moieties capable of generating anionic groups include (meth)acrylic acid, organic acids and their anhydrides such as maleic acid and anhydride, itaconic acid and anhydride and succinuc acid and anhydride. Preferably, the acid value (AV) of the second polymer is at least 30 mg KOH/g of non-vol polymer solids, more preferably from 30 to 300 mg KOH/g of non-vol polymer solids, even more preferably from 50 to 300 mg KOH/g of non-vol polymer solids and most preferably from 60 to 250 mg KOH/g non-vol polymer solids.

Basic dispersing groups include amine groups.

Preferably the amine value is from 50 to 300 and more preferably from 60 to 250 mg KOH/g non-vol polymer solids.

Preferably the mixture of first and second polymer comprises from 2 to 60 parts of first polymer and from 40 to 98 parts of second polymer, more preferably from 15 to 60 parts of first polymer and from 40 to 85 parts of second polymer, yet more preferably from 25 to 50 parts of first polymer and 50 to 75 parts of second polymer and most preferably from 30 to 40 parts of first polymer to 60 to 70 parts of second polymer.

Additional polymers may be included. In another aspect of the invention, a third polymer is included in the mixture of step i). Generally, such a polymer is chosen to modify coating properties such as adhesion, slip or hardness or to modify the seal strength of a heat sealable composition based on the resulting dispersion.

By aqueous medium is meant water containing up to 10 wt % of organic solvent, preferably up to 5wt %. Suitable solvents include alcohols such as butanol, ether alcohols such as butoxy-ethanol, ketones such as acetone. Preferably, the aqueous medium is free of any volatile organic solvent as this minimises emissions to the atmosphere. More preferably, the aqueous medium is free of organic solvent and most preferably it is water.

The aqueous medium may also contain neutralising agent to adjust the pH so that at least some of any acid or basic moieties on the second polymer are neutralised. Preferably, the neutralising agent is a base. Suitable bases include ammonia; organic bases such as amines including dimethylamino ethanol and triethylamine; inorganic bases such as the alkali metal hydroxides including sodium hydroxide and potassium hydroxide.

The term miscible in this context is intended to mean that the second polymer is soluble or partially soluble or self dispersing in the aqueous medium, preferably completely soluble. The term immiscible means insoluble.

Preferably the mixture exits the extruder at from 100 to 230° C., more preferably from 130 to 200° C., even more preferably from 140 to 190° C. and most preferably from 150 to 180° C.

By quench cooling is meant that the rate of cooling the mixture of step ii) or step iii) should be as high as possible, preferably at least 50° C./minute, more preferably 50 to 6000° C./minute, even more preferably from 75° C./minute to 6000° C./minute, yet more preferably from 100° C./minute to 6000° C./minute. Such high cooling rates are also referred to as quench cooling or quenching.

Preferably a cooling liquid is used to quench cool the mixture as it exits the extruder, more preferably the liquid is water. Where water is used as the cooling liquid the initial water temperature (that is, before the extrudate enters the water) should be as low as possible in order to cool the mixture as rapidly as possible. In the case of water, the initial temperature is preferably from 5 to 20° C., more preferably from 10 to 17° C., even more preferably from 12 to 17° C. and most preferably from 13 to 17° C.

The cooling liquid must not dissolve the first polymer and more preferably does not dissolve either the first or the second polymer.

It is thought that the molten mixture exiting the extruder comprises droplets or particles of the first polymer in a liquid matrix of the second polymer. Preferably, the droplets or particles are formed in step ii) of the process. The act of quench cooling prevents the droplets from agglomerating, probably by raising the viscosity of the second polymer and preventing individual droplets coming together.

Following cooling, the mixture solidifies having the approximate shape and dimensions of the extruder exit die. In the examples hereinbelow, the mixture has the dimensions of spaghetti.

Preferably, the ratio of the melt viscosity of the first and second polymers measured at the melt blending temperature, typically from 160 to 210° C. and the melt blending shear rate, typically from 50 to 200s$^{-1}$, is from 0.01:1 to 100:1, more preferably from 0.1:1 to 10:1 and most preferably from 0.3:1 to 3:1 as this also helps to produce finer particles in the aqueous dispersion.

In another aspect of the invention there is provided a dispersion of polymer particles produced by the process of the invention.

Only gentle agitation of the solid product in the aqueous medium is normally required to form the dispersion although high speed stirring can also be used. Homogenisers such as a Silverson or ultrasonic type may also be used if necessary.

The particles of the dispersion of the invention have a mean particle size of from 0.01 to 10 µm, preferably from 0.01 to 7 µm, more preferably from 0.01 to 0.5 µm.

Preferably the dispersion is free of added surfactants as poor water resistance can arise in the final coatings due to their low molecular weight of, typically less than 500 Daltons, In a further aspect of the invention there is provided a coating composition comprising a dispersion of the invention. In applications where chemical and heat resistance is important, as in the interiors of cans, crosslinkers may optionally be used. Suitable crosslinking resins may be selected according to the reactive moieties on either or both of the first and second polymer. Preferably they are selected to react with the moieties of the second polymer as these are likely to be more accessible as they are on the exterior of the microparticles comprising the dispersion. Suitable crosslinking resins include amino resins such as melamine-formaldehyde resins, urea-formaldehyde resins, phenol formaldehyde resin, benzoguanamine resins.

In other coatings, such as architectural coatings, such high chemical and heat resistance are not required properties, in which case heat activated crosslinking is not usually necessary.

In a still further aspect of the invention there is provided an article coated with a coating composition of the invention. Preferably, the coating is crosslinked.

EXAMPLES

The invention will now be illustrated by the following examples.

The following materials were used in preparing the dispersions. The extruder used was a Leistritz micro 18 GL 40D twin screw extruder.

First Polymer (Polymer 1)

Evatene 28-150 is an ethylene vinyl acetate copolymer from Arkema Inc.

Fusabond M613-05 is a maleic anhydride modified Polypropylene copolymer from Dupont Polybond 3000 is an acrylic acid modified Polypropylene copolymer from Chemtura Corporation.

Solus 2100 is a Cellulose butyl acetate ester resin from Eastman Chemical Company.

EVA 25-19 is copolymer of ethylene and vinyl acetate monomers with vinyl acetate content of 25% and melt index of 19 g/10 minutes and is available from Sigma Aldrich.

E-MA-GMA is a copolymer of ethylene, methyl acrylate (MA), and glycidyl methacrylate (GMA) monomers with MA content of 25% and GMA content of 8%. It has a melt index of 6g/10 minutes and is available from Sigma Aldrich.

Nylon 6 is a semi-crystalline polyamide available from Sigma Aldrich.

Biomer P209 is a polyhydroxyalkanoate biopolyester which has a melt flow index at 180° C. of 10 and a density of 1.20 g/cm$^3$ and is available from Biomer, Forst-Kasten-Str. 15 D-82152 Krailling, Germany.

Biomer P226 is a polyhydroxyalkanoate biopolyester from Biomer which has a melt flow index of 10 (5 kg) and a density of 1.25 g/cm$^3$ Second Polymer (Polymer 2)

Elvacite 2669: a carboxylic acid functional methyl methacrylate copolymer with an Inherent Viscosity of 0.32, Tg of 70° C., and an Acid Number of 124 and is available from Lucite International.

Primacor 59901 is a copolymer of ethylene and 20% acrylic acid and has a Melt Flow Index of 1300 (190° C./2.16 kg) and is available from Dow Chemicals.

SMA 1 is a copolymer of styrene and maleic anhydride (styrene:maleic anhydride 3:1 and average molecular weight, Mn ca 1900 Daltons) and is available from Sigma-Aldrich, UK.

SMA 2 is a copolymer of styrene and maleic anhydride (styrene:maleic anhydride 1.3:1 and average molecular weight, Mn ca 1600 Daltons) and is available from Sigma-Aldrich, UK.

Wedge Bend Flexibility Test

A 10×4 cm metal panel was coated with the test coating and stoved. The panel was bent lengthways, with the coating facing outward around a cylindrical mandrel of 5 mm diameter forming a U shape. This was retained on a base plate, one end of which was higher than the other and a weight of 2.4 kg dropped on it from a height of 65 cm. This produced a panel with a varying radius of curvature along its length. The panel was then immersed in acidified copper sulphate solution for one minute, after which time it was removed and rinsed with water. Copper is deposited where the coating has failed to the metal. The performance of the coating was estimated by measuring the length of unaffected coating, expressed as a percentage of the total length.

Examples

Dispersion Preparation

Various weight ratios of Polymer 1 and Polymer 2, as indicated in Tables 1-4, were mixed together. These mixtures of solids were fed into the feed throat of the extruder. The feed rate and processing conditions are given in the tables below. Upon leaving the extruder, about 500 g of the molten extrudate was collected in 4 litres of cold water at 15° C. and allowed to solidify. The temperature of the water increased to 22° C. The solid extrudate was broken and converted into a dispersion using the following method unless otherwise indicated in the table.

Solid extrudate (3 parts), Water (27 parts), and Ammonia solution 25% (2 parts) were placed inside a lidded glass jar. The jar was placed in an ultrasonication water bath at 70° C. and was subjected to ultrasound treatment for 90 minutes. The contents of the jar were filtered through muslin and the filtered product was analyzed using a Malvern Mastersizer S instrument to establish the mean particle size of the resulting polymer dispersion.

Polymers 1 and 2 of Examples 1-4 and 7A do not co-react whereas in the remaining examples the polymers contain moieties which are reactive towards each other.

TABLE 1

| Example | Polymer 1 and Polymer 2 ratio and (feed rate) | Extruder Screw Speed (rpm) | Extrusion Melt temp. (° C.) | Melt Blending Temp. (° C.) | Mixture Exit Temp. (° C.) | Mean Particle Size-D50 (μm) |
|---|---|---|---|---|---|---|
| 1 | Evatene 28-150:Elvacite 2669 1:4 (1.40 kg/hr) | 200 | 190 | 170 | 150 | 2.0 |
| 2 | Fusabond M613-05:Elvacite 2669 1:4 (1.40 kg/hr) | 200 | 190 | 170 | 150 | 2.8 |
| 3 | Polybond 3000:Elvacite 2669 1:4 (1.40 kg/hr) | 200 | 230 | 200 | 190 | 3.4 |
| 4 | Fusabond M613-05:Primacor 59901 4:6 (1.40 kg/hr) | 200 | 190 | 170 | 150 | 4.0 |
| 5 | Solus 2100:Elvacite 2669 4:1 (1.60 kg/hr) | 200 | 190 | 170 | 150 | 2.0 |
| 6 | Solus 2100:Primacor 59901 4:6 (1.4 kg/hr) | 200 | 190 | 170 | 150 | 4.0 |

2. Evaluation of Dispersions as Coatings

Examples 1-3 of the dispersions and a 10 wt % aqueous solution of Elvacite 2669 were applied (using a K-Bar number 36) onto Aluminium and Tin-free Steel panels to give a dry film weight of approximately 4 μm. These panels were exposed to heat (200° C. for 2 mins) in a box oven. The coatings were then subjected to the Wedge Bend Test, as described earlier, to assess coating flexibility. The percentage pass is given in Table A for coatings tested.

TABLE A

| Coating | % Wedge Bend Pass on Aluminium | % Wedge Bend Pass on Tin-free Steel |
|---|---|---|
| Control: Elvacite 2669 | 0 | 50 |
| Example 1 | 15 | 60 |
| Example 2 | 25 | 60 |
| Example 3 | 60 | 80 |

The above table shows the benefits of improved flexibility of coatings derived from dispersions of the invention.

Further Examples

Table 2 shows data for dispersions prepared according to the method described above but using different processing conditions and different copolymers as indicated in the table.

TABLE 2

| Example | Polymer 1 and Polymer 2 ratio and (feed rate) | Extruder Screw Speed (rpm) | Extrusion Melt temp.(° C.) | Melt Blending Temp. (° C.) | Mixture Exit Temp.(° C.) | Mean Particle Size-D50 (μm) |
|---|---|---|---|---|---|---|
| 7A Polymers 1&2 not co-reactive | EVA 25-19:Elvacite 2669 1:2 (1.40 kg/hr) | 200 | 220 | 200 | 150 | 7.0 |
| 7B | E-MA-GMA:Elvacite 2669 1:2 (1.40 kg/hr) | 200 | 220 | 200 | 150 | 0.6 |
| 8 | E-MA-GMA:SMA 3000 1:2 (1.40 kg/hr) | 200 | 220 | 200 | 150 | 4.1 |
| 9 | Nylon 6:Primacor 59901 1:2 (1.40 kg/hr) | 200 | 220 | 200 | 150 | 4.0 |
| 10 | Nylon 6:Elvacite 2669 1:2 (1.40 kg/hr) | 200 | 220 | 200 | 150 | 3.0 |

Composition 7A and & 7B show the influence of co-reaction between two immiscible polymers. In composition 7B the oxirane functionality in E-MA-GMA copolymer is able to partially react with the carboxylic acid groups found in Elvacite 2669 and this results in formation of finer polymer particles. However, in composition 7A there is no co-reaction because of absence of reactive groups and surprisingly larger polymer particles are obtained.

Examples

Coating Evaluation

Dispersions 7A, 7B, 8-10 were evaluated as coatings by applying onto aluminium panels according to the method above.

TABLE B

| Coating | % Wedge Bend Pass on Aluminium |
|---|---|
| Example 7A | 40 |
| Example 7B | 70 |
| Example 8 | 60 |
| Example 9 | 70 |
| Example 10 | 70 |

The advantage of co-reaction of the polymers through the reactive moieties is clear.

Quench Cooling

Examples 11 and 12 along with comparative Examples 11C and 12C illustrate the importance of quench cooling. The method to prepare these samples is as outlined previously with any differences in processing temperatures indicated in Table 3 below. For the quenched samples the product was collected as outlined before by collecting in a metal container with 4 litres of water at 15° C. For the comparative samples 11C and 12C the product was collected into air at room temperature.

The results in Table 3 show that with quench cooling the mean particle size is smaller and the maximum size of particle in the dispersion is significantly reduced.

TABLE 3

| Example | Polymer 1 and Polymer 2 ratio and (feed rate) | Extruder Screw Speed (rpm) | Extrusion Melt temp. (° C.) | Melt Blending Temp. (° C.) | Mixture Exit Temp. (° C.) | Mean Particle Size- D50 (μm) | Max. particle size- D100 (um) |
|---|---|---|---|---|---|---|---|
| 11 | E-MA-GMA:Elvacite 2669 1:2 (1.40 kg/hr) | 200 | 220 | 200 | 150 | 0.6 | 40 |
| 11C Not quench cooled | E-MA-GMA:Elvacite 2669 1:2 (1.40 kg/hr) | 200 | 220 | 200 | 150 | 3.0 | 400 |

TABLE 3-continued

| Example | Polymer 1 and Polymer 2 ratio and (feed rate) | Extruder Screw Speed (rpm) | Extrusion Melt temp. (° C.) | Melt Blending Temp. (° C.) | Mixture Exit Temp. (° C.) | Mean Particle Size-D50 (μm) | Max. particle size-D100 (um) |
|---|---|---|---|---|---|---|---|
| 12 | Fusabond M613-05:Elvacite 2669 1:4 (1.70 kg/hr) | 200 | 220 | 200 | 170 | 1.5 | 15 |
| 12C Not quench cooled | Fusabond M613-05:Elvacite 2669 1:4 (1.70 kg/hr) | 200 | 220 | 200 | 170 | 3.0 | 300 |

Example 11 was a repeat of Example 7b.

Example 12 & 12C used the same polymers as Example 2 but was made using different extruder conditions.

Examples 13-18

Mixtures of polyhydroxyalkanoate biopolymer (P209 or P216) and styrene-maleic anhydride (SMA 1 or SMA2) were processed through the extruder using the conditions indicated below and quench cooled or not on exit from the extruder as indicated. Table 4 summarises the particle size data using polyhydroxy alkanoate biopolymer as polymer 1 and differing grades of styrene-maleic anhydride as polymer 2.

Examples 13-18 were all processed at extruder screw speed of 200 rpm, extrusion melt temperature of 200° C., melt blending temperature of 170° C. and mixture exit temperature of 170° C.

The dispersions were made using the following procedure:

Extrudate or solid product (100 parts), Water (300 parts), and sodium hydroxide solution (5 parts of 25% aqueous solution) were placed in a glass beaker. The contents were subjected to high shear conditions by means of a Silverson High Speed Homogeniser at 8000 rpm for 30 minutes. The beaker was in an ice bath to maintain temperature between 20-30° C. The resulting product was filtered through muslin cloth and the filtered product analyzed using a Malvern Mastersizer S instrument to establish the mean particle size of the resulting polymer dispersion.

TABLE 4

| Example | Polymer 1 and Polymer 2 ratio and (feed rate) | Mean Particle Size-D50 quenched cooled (μm) | Mean Particle Size-D50 not quenched cooled (μm |
|---|---|---|---|
| 13 | P209:SMA 1 1:4 (3.0 kg/hr) | 4.1 | 6.8 |
| 14 | P209:SMA 1 1:2 (3.0 kg/hr) | 6.3 | 10.0 |
| 15 | P226:SMA 1 1:2 (3.0 kg/hr) | 5.8 | 10.2 |
| 16 | P209:SMA 2 1:4 (3.0 kg/hr) | 5.8 | 6.4 |
| 17 | P209:SMA 2 1:2 (3.0 kg/hr) | 7.2 | 9.3 |
| 18 | P226:SMA 2 1:2 (3.0 kg/hr) | 5.9 | 10.5 |

The PHA and SMA co-react by acidolysis and transesterification.

As shown in the earlier examples, quench cooling the product produces finer particles of PHA.

Example 13 (quench cooled) was applied onto a glass panel using a block spreader to give a wet film thickness of about 100 microns. The film was allowed to dry at ambient temperature for 3 days. The resulting film was white in appearance and smooth. The film was subjected to an Erichsen Hardness Pendulum Tester and gave a hardness value of 140 seconds.

The invention claimed is:

1. A process for the manufacture of an aqueous polymer dispersion comprising the steps of
   i) providing a mixture of a first and second polymer each having a viscosity greater than 30 Pa·s at 100 s$^{-1}$ when measured at 100° C., the mixture comprising
      a) from 1 to 60 parts by weight of a first polymer immiscible in aqueous medium and optionally comprising reactive moieties, and
      b) from 40 to 99 parts by weight of a second polymer comprising dispersing groups, the polymer being miscible in the aqueous medium and optionally further comprising moieties reactive with the moieties on the first polymer,
   ii) causing the polymers to melt at a chosen temperature under conditions of high shear in an extruder to form an intimate mixture of the polymers,
   iii) quench cooling the molten mixture of step ii) outside the extruder to form a solid product,
   iv) contacting the solid product with the aqueous medium, wherein the aqueous medium dissolves the second polymer but not the first polymer to form a dispersion comprising microparticles of the first polymer in an aqueous solution of the second polymer.

2. The process according to claim 1, wherein the first and second polymer comprise reactive moieties wherein the moieties on the first polymer are reactive with those on the second.

3. The process according to claim 2, wherein at least some of the reactive moieties have been caused to react.

4. The process according to claim 3, wherein all of the reactive moieties have been caused to react.

5. The process according to claim 1, wherein the quench cooling of step iii) is performed by extruding the molten mixture from the exit of the extruder into a cooling liquid.

6. The process according to claim 5, wherein the cooling liquid is water.

7. The process according to claim 1, wherein the rate of cooling the reaction mixture in step iii) is at least 50° C./minute.

8. The process according to claim 1, wherein the second polymer has an acid value of at least 30 mg KOH/g of non-vol polymer solids.

9. A dispersion of polymer particles produced by the process of claim 1.

10. The dispersion according to claim 9, where the first polymer is polypropylene or a copolymer of polypropylene and the second polymer is an acrylate or a methacrylate with an acid value of at least 30 mg KOH/g of polymer.

11. The dispersion according to claim 9, wherein the first polymer is a polyhydroxyalkanoate.

12. The dispersion according to claim 11, where the second polymer is a styrene-maleic anhydride.

13. The dispersion according to claim 9, wherein the dispersion is free of organic liquid.

14. A coating composition comprising a dispersion of claim 9.

15. The coating composition according to claim 14 and a crosslinker.

16. An article coated with a coating composition according to claim 14.

17. The process of claim 1, further comprising breaking up the solid product into smaller pieces.

18. The process of claim 1, further comprising
causing the reactive moieties of the first and second polymer to react with each other,
under conditions of high shear in an extruder, to form a reacted mixture, and
quench cooling the molten mixture of the previous step outside the extruder to form a solid product.

19. The process according to claim 18, wherein the quench cooling step is performed by extruding the molten mixture from the exit of the extruder into a cooling liquid.

20. The process according to claim 19, wherein the cooling liquid is water.

21. The process according to claim 18, wherein the rate of cooling the reaction mixture is at least 50° C./minute.

\* \* \* \* \*